US011799567B2

(12) United States Patent
Zhang et al.

(10) Patent No.: US 11,799,567 B2
(45) Date of Patent: Oct. 24, 2023

(54) BEAM-SPECIFIC RSSI AND CO FOR NR-U

(71) Applicant: QUALCOMM Incorporated, San Diego, CA (US)

(72) Inventors: Xiaoxia Zhang, San Diego, CA (US); Ozcan Ozturk, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/124,108

(22) Filed: Dec. 16, 2020

(65) Prior Publication Data
US 2022/0190938 A1 Jun. 16, 2022

(51) Int. Cl.
*H04B 7/06* (2006.01)
*H04W 72/08* (2009.01)
(Continued)

(52) U.S. Cl.
CPC .......... *H04B 17/318* (2015.01); *H04W 24/10* (2013.01); *H04W 88/02* (2013.01)

(58) Field of Classification Search
CPC .. H04B 7/0695; H04B 17/318; H04B 7/0632; H04B 7/0645; H04B 7/0647; H04B 7/088; H04B 7/0617; H04B 7/0628; H04W 76/18; H04W 36/08; H04W 74/006; H04W 74/083; H04W 24/10; H04W 72/082;
(Continued)

(56) References Cited

U.S. PATENT DOCUMENTS

2018/0254815 A1* 9/2018 Liu .................. H04L 5/0057
2019/0104549 A1* 4/2019 Deng ................ H04W 72/14
(Continued)

FOREIGN PATENT DOCUMENTS

EP 3281350 A1 2/2018
EP 3826350 A1 5/2021
(Continued)

OTHER PUBLICATIONS

International Search Report and Written Opinion—PCT/US2021/072962—ISA/EPO—dated Jun. 27, 2022.

*Primary Examiner* — Edan Orgad
*Assistant Examiner* — Vanneilian Lalchinthang
(74) *Attorney, Agent, or Firm* — Norton Rose Fulbright LLP

(57) ABSTRACT

Wireless communication techniques for utilizing beam-specific RSSI and CO in NR-U wireless communication are discussed. A UE may receive from a base station a first set of one or more RSSI measurement configuration parameters associated with a first reception beam as well as a second set of one or more RSSI measurement configuration parameters associated with a second reception beam. The second reception beam may be different than the first reception beam. The UE may transmit a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

38 Claims, 8 Drawing Sheets

(51) Int. Cl.
*H04L 5/00* (2006.01)
*H04W 24/10* (2009.01)
*H04B 17/318* (2015.01)
*H04W 88/02* (2009.01)

(58) Field of Classification Search
CPC . H04W 72/0446; H04W 48/16; H04W 88/02; H04W 16/28; H04L 1/0026
USPC .......................................................... 370/252
See application file for complete search history.

(56) References Cited

U.S. PATENT DOCUMENTS

| | | |
|---|---|---|
| 2019/0253912 A1* | 8/2019 | Yao ........................ H04W 24/10 |
| 2019/0289535 A1* | 9/2019 | Lu ....................... H04W 74/0808 |
| 2019/0319686 A1* | 10/2019 | Chen, IV ............. H04B 7/0639 |
| 2020/0029238 A1 | 1/2020 | Si et al. |
| 2020/0052803 A1 | 2/2020 | Deenoo et al. |
| 2020/0305038 A1* | 9/2020 | Tooher ............... H04W 74/0833 |
| 2020/0374892 A1* | 11/2020 | Kusashima ......... H04W 72/085 |
| 2020/0374960 A1* | 11/2020 | Deenoo ............. H04W 72/1284 |
| 2020/0396633 A1* | 12/2020 | Tseng ................ H04W 74/0833 |
| 2021/0167821 A1* | 6/2021 | Chen ................... H04B 7/0408 |
| 2021/0297170 A1* | 9/2021 | Niu ....................... H04B 7/0639 |
| 2021/0307078 A1* | 9/2021 | Singh .................... H04W 16/14 |
| 2021/0368393 A1* | 11/2021 | Kotecha ................ H04B 7/063 |
| 2022/0053353 A1* | 2/2022 | Lee ..................... H04L 41/0668 |
| 2022/0086843 A1* | 3/2022 | Ying ................ H04W 72/0446 |

FOREIGN PATENT DOCUMENTS

| | | |
|---|---|---|
| WO | WO-2020015582 A1 | 1/2020 |
| WO | WO-2020167797 A1 | 8/2020 |

\* cited by examiner

BEAM-SPECIFIC RSSI AND CO FOR NR-U

TECHNICAL FIELD

Aspects of the present disclosure relate generally to wireless communication systems, and more particularly, to techniques for utilizing beam-specific received signal strength indicator (RSSI) and channel occupancy (CO) in NR-U wireless communication. Some features may enable and provide improved communications, including higher data rates, higher capacity, better spectral efficiency, and higher reliability.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio-frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a UE is provided. For example, a method can include receiving a first set of one or more received signal strength indicator (RSSI) measurement configuration parameters associated with a first reception beam. The method can further include receiving a second set of one or more RSSI measurement configuration parameters associated with a second reception beam, wherein the second reception beam is different than the first reception beam. The method can also include transmitting a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

In another aspect of the disclosure, a UE configured for wireless communication is provided. For example, the UE can include means for receiving a first set of one or more RSSI measurement configuration parameters associated with a first reception beam. The UE can also include means for receiving a second set of one or more RSSI measurement configuration parameters associated with a second reception beam, wherein the second reception beam is different than the first reception beam. The UE can further include means for transmitting a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

In an additional aspect of the disclosure, a non-transitory computer-readable medium having program code recorded thereon is provided. The program code can include program code executable by a computer for causing the computer to receive a first set of one or more RSSI measurement configuration parameters associated with a first reception beam. The program code can also include program code executable by the computer for causing the computer to receive a second set of one or more RSSI measurement configuration parameters associated with a second reception beam, wherein the second reception beam is different than the first reception beam. The program code can further include program code executable by the computer for causing the computer to transmit a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI.

In another aspect of the disclosure, a UE is provided. The UE may include at least one processor. The UE may also include at least one memory coupled to the at least one processor. The at least one processor can be configured to receive a first set of one or more RSSI measurement configuration parameters associated with a first reception beam. The at least one processor can also be configured to receive a second set of one or more RSSI measurement configuration parameters associated with a second reception beam, wherein the second reception beam is different than the first reception beam. The at least one processor can be further configured to transmit a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

In one aspect of the disclosure, a method for wireless communication performed by a base station is provided. For example, a method can include transmitting a first set of one or more RSSI measurement configuration parameters associated with a first reception beam of a UE. The method can further include transmitting a second set of one or more RSSI measurement configuration parameters associated with a second reception beam of the UE, wherein the second reception beam is different than the first reception beam. The method can also include receiving a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

In another aspect of the disclosure, a base station configured for wireless communication is provided. For example, the base station can include means for transmitting a first set of one or more RSSI measurement configuration parameters associated with a first reception beam of a UE. The base station can also include means for transmitting a second set of one or more RSSI measurement configuration parameters associated with a second reception beam of the UE, wherein the second reception beam is different than the first reception beam. The base station can further include means for receiving a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

In an additional aspect of the disclosure, a non-transitory computer-readable medium having program code recorded thereon is provided. The program code can include program code executable by a computer for causing the computer to transmit a first set of one or more RSSI measurement configuration parameters associated with a first reception beam of a UE. The program code can also include program code executable by the computer for causing the computer to transmit a second set of one or more RSSI measurement configuration parameters associated with a second reception beam of the UE, wherein the second reception beam is different than the first reception beam. The program code can further include program code executable by the computer for causing the computer to receive a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

In another aspect of the disclosure, a base station is provided. The base station may include at least one processor. The base station may also include at least one memory coupled to the at least one processor. The at least one processor can be configured to transmit a first set of one or more RSSI measurement configuration parameters associated with a first reception beam of a UE. The at least one processor can also be configured to transmit a second set of one or more RSSI measurement configuration parameters associated with a second reception beam of the UE, wherein the second reception beam is different than the first reception beam. The at least one processor can be further configured to receive a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
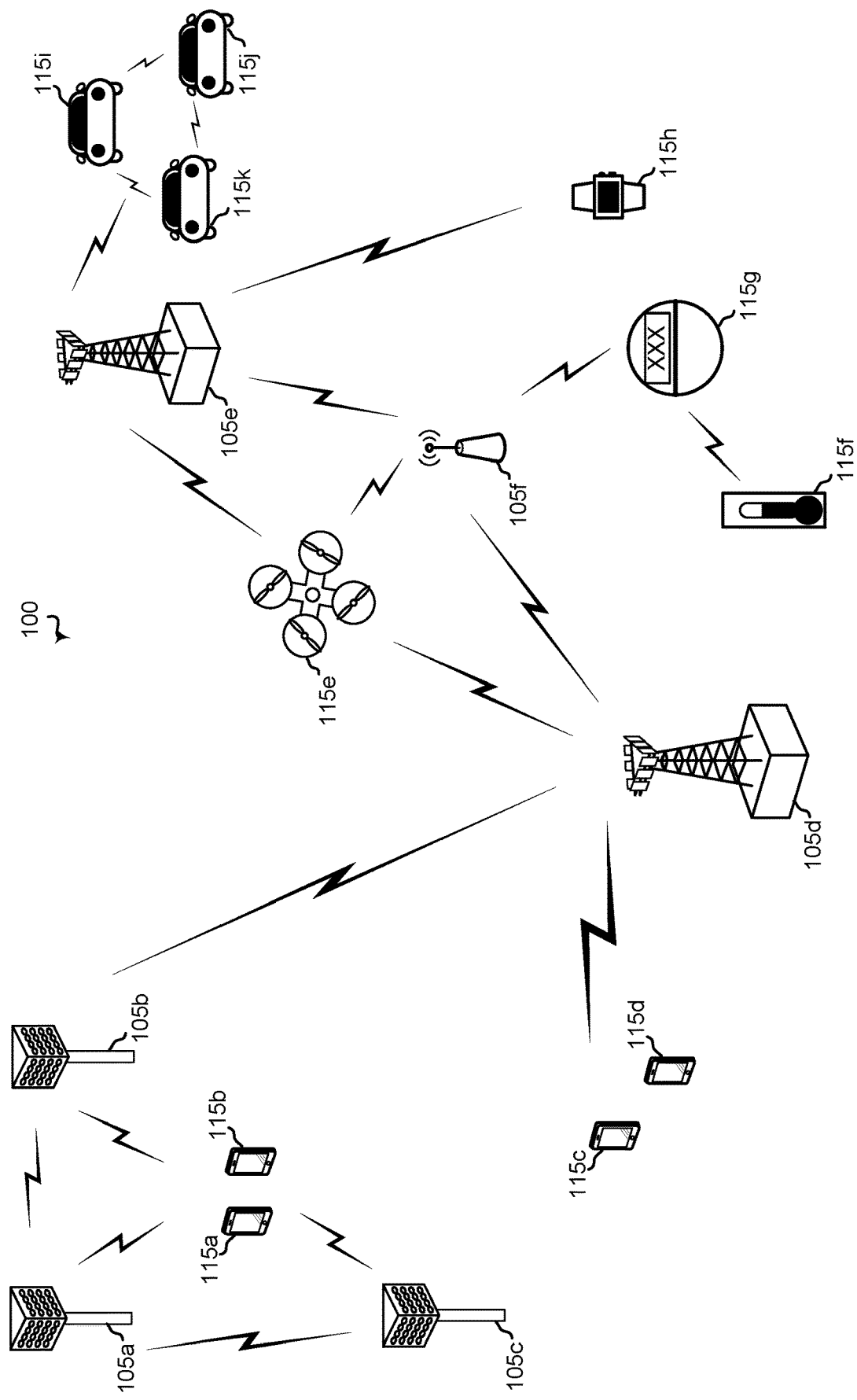
FIG. 1 is a block diagram illustrating details of an example wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
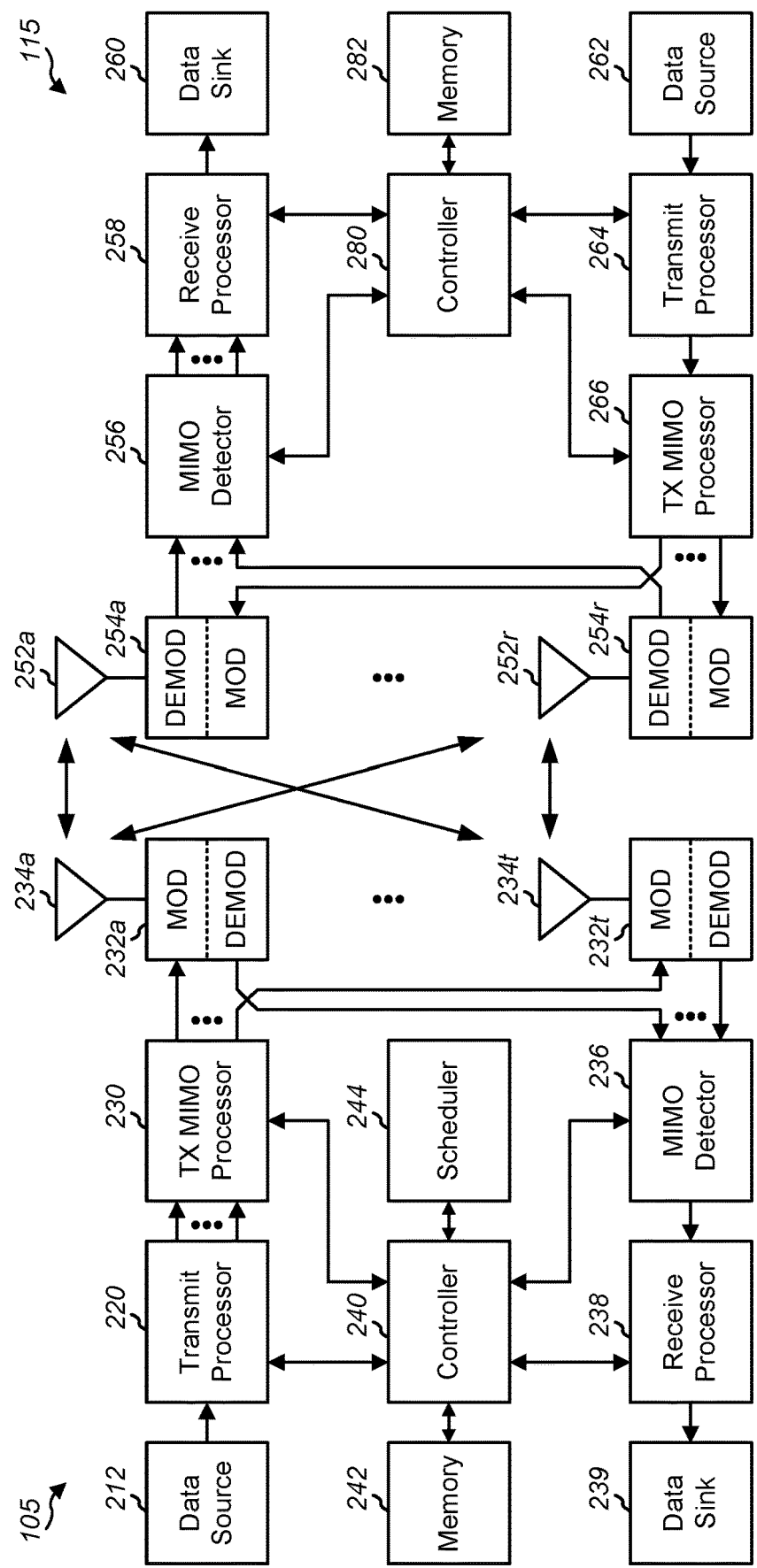
FIG. 2 is a block diagram illustrating examples of a base station and a user equipment (UE) according to some aspects of the present disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 3 and 4, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In some aspects of the disclosure, a base station, such as base station/gNB 105, and a UE, such as UE 115, may communicate using 5G NR in unlicensed spectrum (NR-U) technology. According to some aspects, NR-U wireless communication may include wireless communication in mmWave frequency bands. For example, NR-U wireless communication may include wireless communication in the 60 GHz unlicensed spectrum or the 37 GHz shared spectrum, as just a few options.

According to some aspects, a base station and a UE may each utilize beamforming techniques for mmWave 5G NR-U wireless communication. In some aspects, a beam may refer to a particular antenna beam directivity configuration of an antenna array. In some aspects, a base station may use different beams to transmit information in different communication scenarios. A base station may also use different beams to receive information in different communication scenarios. Similarly, a UE may use different beams to transmit information in different communication scenarios, and may use different beams to receive information in different communication scenarios. According to some aspects, beamforming techniques may be used to increase coverage through the use of multiple antenna elements and to reduce cost by reducing the digital chain in a wireless communication device.

In some aspects, a UE may experience different levels of interference when some beams are used for wireless communication than when other beams are used for wireless communication. For example, a beam directed in one particular direction may experience higher interference than another beam directed in another particular direction.

According to some aspects, as part of NR-U wireless communication, a base station may need to know how much interference a UE experiences in various wireless communication scenarios, such as when different beams are used for wireless communication.

Aspects of this disclosure may provide techniques for utilizing beam-specific metrics in NR-U wireless communication to measure and report beam-specific interference information. For example, a beam-specific received signal strength indicator (RSSI) metric and/or a beam-specific channel occupancy (CO) metric may be used to measure and report beam-specific interference information. In some embodiments, a base station may provide beam-specific configuration parameters that the UE can use to make beam-specific RSSI and/or CO measurements and to provide reports that include beam-specific interference information.

Figure 3:
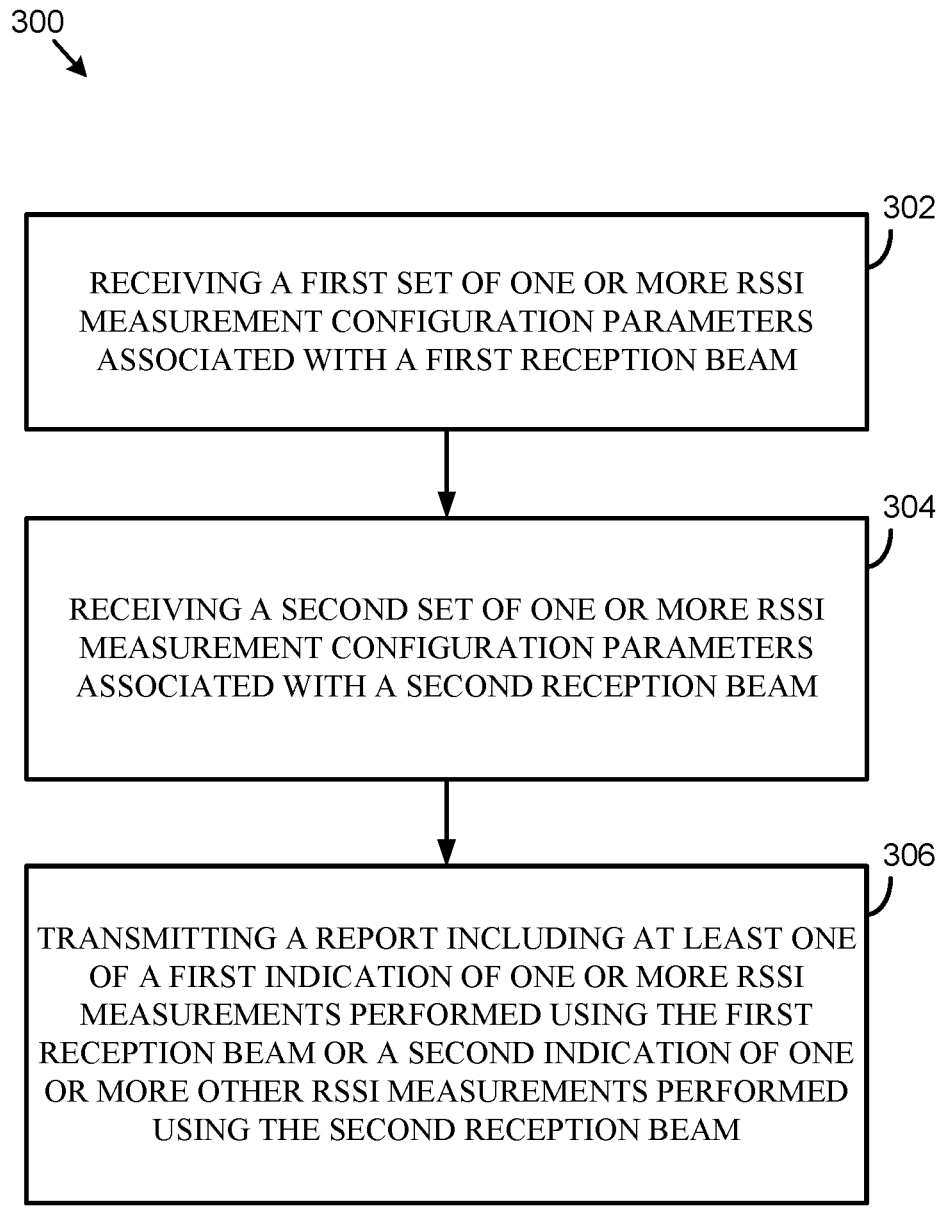
FIG. 3 is a block diagram illustrating a method for utilizing beam-specific RSSI and CO in NR-U wireless communication according to some aspects of the present disclosure.

FIG. 3, as an example, shows a block diagram illustrating a method for utilizing beam-specific RSSI and CO in NR-U wireless communication according to some aspects of the present disclosure. Aspects of method 300 may be implemented with various other aspects of this disclosure described with respect to FIGS. 1-2 and 5-7, such as a mobile device/UE. For example, with reference to FIG. 2, controller/processor 280 of UE 115 may control UE 115 to perform method 300.

FIG. 3 illustrates a method 300 that may be performed by a UE, such as a UE 115. At block 302, a UE, such as UE 115, may receive a first set of one or more RSSI measurement configuration parameters associated with a first reception beam. For example, the UE may receive the first set of one or more RSSI measurement configuration parameters associated with a first reception beam from a base station. Similarly, at block 304, a UE may receive a second set of one or more RSSI measurement configuration parameters associated with a second reception beam. For example, the UE may receive the second set of one or more RSSI measurement configuration parameters associated with a second reception beam from a base station.

In some aspects, a reception beam may refer to a beam used by a wireless communication device to receive wireless communication signals. Therefore, in some aspects, the first reception beam and the second reception beam may each refer to beams used by the UE to receive signals.

According to some aspects, the second reception beam may be different than the first reception beam. For example, in some aspects, the first reception beam may be wider than the second reception beam. As an example, the radiation pattern associated with the first reception beam may be wider than the radiation pattern associated with the second reception beam. Stated differently, the width of the first reception beam may be wider than the width of the second reception beam. In other aspects, the second reception beam may be wider than the first reception beam.

In some aspects, a UE may also receive information identifying reception beams associated with RSSI measurement configuration parameters. For example, a UE may receive an indication of the first reception beam. As an example, a UE may receive information that identifies the first reception beam that is associated with the first set of one or more RSSI measurement configuration parameters. In additional aspects, a UE may receive an indication of the second reception beam. As an example, a UE may receive information that identifies the second reception beam that is associated with the second set of one or more RSSI measurement configuration parameters. According to some aspects, a base station may be configured to transmit an indication of the first reception beam. In additional aspects, a base station may be configured to transmit an indication of the second reception beam.

According to some aspects, RSSI measurement configuration parameters may include various parameters. For example, RSSI measurement configuration parameters may include an indication of a measurement duration, e.g., to specify a time duration for RSSI measurements. RSSI measurement configuration parameters may also include an indication of a measurement periodicity, e.g., to specify a time periodicity for RSSI measurements. RSSI measurement configuration parameters may further include an indication of a subframe offset, e.g., to specify at least one subframe during which a UE may perform RSSI measurements. RSSI measurement configuration parameters may also include an indication of a center frequency parameter, e.g., to specify a center frequency for RSSI measurements. RSSI measurement configuration parameters may further include an indication of a CO threshold, e.g., to specify an RSSI threshold value that may be used for RSSI measurements used to determine CO. RSSI measurement configuration parameters may also include an indication of a reporting periodicity, e.g., to specify a time periodicity for a UE to transmit reports with RSSI measurements to a base station. According to some aspects, RSSI measurement configuration parameters may include at least one of the foregoing parameters.

In some aspects, the first set of one or more RSSI measurement configuration parameters and the second set of one or more RSSI measurement configuration parameters may be received by a UE from a base station in a variety of ways. For example, in some aspects, the first set of one or more RSSI measurement configuration parameters and the second set of one or more RSSI measurement configuration parameters may be received by a UE from a base station in the same control message session, e.g., the same radio resource control (RRC) communication session. In additional aspects, the first set of one or more RSSI measurement configuration parameters and the second set of one or more RSSI measurement configuration parameters may be received by a UE from a base station in different control message sessions, e.g., different RRC communication sessions.

According to some aspects, a UE may perform one or more RSSI measurements using the first reception beam based, at least in part, on the first set of one or more RSSI measurement configuration parameters. For example, as shown at block 302, the first set of one or more RSSI measurement configuration parameters may be associated with the first reception beam. As an example, the first set of one or more RSSI measurement configuration parameters may specify details for one or more RSSI measurements to be performed using the first reception beam. Thus, in some aspects, a UE performing the one or more RSSI measurements using the first reception beam based, at least in part, on the first set of one or more RSSI measurement configuration parameters may include the UE performing the one or more RSSI measurements using the first reception beam in accordance with the first set of one or more RSSI measurement configuration parameters.

In some aspects, a UE may perform one or more other RSSI measurements using the second reception beam based, at least in part, on the second set of one or more RSSI measurement configuration parameters. For example, as shown at block 304, the second set of one or more RSSI measurement configuration parameters may be associated with the second reception beam. As an example, the second set of one or more RSSI measurement configuration parameters may specify details for one or more RSSI measurements to be performed using the second reception beam. Thus, in some aspects, a UE performing the one or more RSSI measurements using the second reception beam based, at least in part, on the second set of one or more RSSI measurement configuration parameters may include the UE performing the one or more RSSI measurements using the second reception beam in accordance with the second set of one or more RSSI measurement configuration parameters.

RSSI measurements may include various measurements. For example, in some aspects, an RSSI measurement may include a measurement of an RSSI value. According to some aspects, an RSSI value may be a power value. In some aspects, multiple RSSI values may be measured during a specified duration, such as a reporting interval duration or a measurement duration. According to some aspects, when multiple RSSI values are measured, a UE may also compute an average of all the RSSI values measured during a specified duration, such as a reporting interval duration or a measurement duration.

In additional aspects, an RSSI measurement may include a measurement of a CO value. In some aspects, a CO value may be calculated to be a rounded percentage of RSSI values that are greater than, or in some aspects also equal to, a configured CO threshold, such as the CO threshold indication described previously, within all the RSSI values measured during a specified duration, such as a reporting interval duration or a measurement duration. In other words, a CO value may be the value that results when the number of RSSI values measured to be greater than, or in some embodiments equal to, the indicated CO threshold during a specified duration is divided by the total number of RSSI values measured during that same specified duration. Thus, in some aspects, one or more RSSI measurements may include at least one of a single measurement of an RSSI value, multiple measurements of RSSI values, an average RSSI value of multiple measurements of RSSI values, or a CO value measurement.

RSSI measurements may be performed in various frequency bands. For example, RSSI measurement may be performed in mmWave frequency bands, such as the 60 GHz unlicensed spectrum or the 37 GHz shared spectrum, to name just a few options.

At block 306, method 300 includes a UE reporting the results of one or more RSSI measurements performed by the UE using various reception beams, such as the first reception beam and/or the second reception beam. For example, as shown at block 306, a UE may be configured to transmit to a base station a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters. In some aspects, the first indication may be at least one of a single RSSI value, multiple RSSI values, an average RSSI value, or a CO value. In additional aspects, the second indication may be at least one of a single RSSI value, multiple RSSI values, an average RSSI value, or a CO value. According to some aspects, the UE may transmit to a base station a report including one of the indications or both of the indications. For example, in some aspects, the UE may transmit a report including at least one of the first indication of the one or more RSSI measurements performed using the first reception beam or the second indication of the one or more other RSSI measurements performed using the second reception beam.

According to some aspects, at least one parameter of the first set of one or more RSSI measurement configuration parameters may have a different value than a corresponding parameter of the second set of one or more RSSI measurement configuration parameters. For example, in some aspects, beamforming gain may be higher when a narrow beam is used by a UE for reception, so it may be possible to configure a larger CO threshold when a narrow beam is used by the UE for reception. In additional aspects, a measurement performed using a narrow beam may miss capturing some interference, so it may be possible to configure longer measurement durations or shorter periodicities when a narrow beam is used by a UE for reception.

As one example of at least one parameter of the first set of one or more RSSI measurement configuration parameters having a different value than a corresponding parameter of the second set of one or more RSSI measurement configuration parameters, in some aspects, the first set of one or more RSSI measurement configuration parameters may include a first measurement periodicity indication and the second set of one or more RSSI measurement configuration parameters may include a second measurement periodicity indication. In other words, in some aspects, the second measurement periodicity indication may be the corresponding parameter of the second set of one or more RSSI measurement configuration parameters. According to some aspects, the first measurement periodicity indication may have a different value than the second measurement periodicity indication. For example, in some aspects, the first measurement periodicity indication value may be a multiple of the second measurement periodicity indication value.

As another example of at least one parameter of the first set of one or more RSSI measurement configuration parameters having a different value than a corresponding parameter of the second set of one or more RSSI measurement configuration parameters, in some aspects, the first set of one or more RSSI measurement configuration parameters may include a first reporting periodicity indication and the second set of one or more RSSI measurement configuration parameters may include a second reporting periodicity indication. In other words, in some aspects, the second reporting periodicity indication may be the corresponding parameter of the second set of one or more RSSI measurement configuration parameters. According to some aspects, the first reporting periodicity indication may have a different value than the second reporting periodicity indication. For example, in some aspects, the first reporting periodicity indication value may be a multiple of the second reporting periodicity indication value.

In additional aspects, at least one parameter of the first set of one or more RSSI measurement configuration parameters may have the same value as a corresponding parameter of the second set of one or more RSSI measurement configuration parameters.

In some aspects, the first reception beam and the second reception beam may belong to a subset of a plurality of reception beams of the UE. For example, a UE may be capable of using a plurality of reception beams, a subset of which may include the first reception beam and the second reception beam. According to some aspects, RSSI measurement configuration parameters may not be received from a base station for remaining reception beams of the plurality of reception beams besides the first reception beam and the second reception beam. In other words, RSSI measurement configuration parameters may be received from a base station for only the first and second reception beams, but RSSI measurement configuration parameters may not be received from a base station for any of the remaining reception beams of the plurality of reception beams that the UE is capable of using for reception. As a result, RSSI measurements may not be performed using the remaining reception beams of the plurality of reception beams besides the first reception beam and the second reception beam. In other words, RSSI measurements may be performed using only the first and second reception beams, but RSSI measurements may not be performed using any of the remaining reception beams of the plurality of reception beams that the UE is capable of using for reception. In some aspects, a base station may configure only a subset of reception beams to be used to perform RSSI measurements when the base station intends to serve the UE using only the subset of reception beams but not all possible reception beams. In other aspects, a base station may configure only a subset of reception beams to be used to perform RSSI measurements when only the subset of reception beams may be subject to potential strong interference based on other information known to the UE and/or base station, such as a UE L1-SINR/L1-RSRP report.

According to some aspects, a UE may transmit reports in a variety of ways. For example, in some aspects, a report including the first indication of the one or more RSSI measurements performed using the first reception beam and a report including the second indication of the one or more other RSSI measurements performed using the second reception beam may be transmitted by a UE to a base station separately as different reports or together as one report that includes both the first indication and the second indication. In additional aspects, a report including at least one of the first indication of the one or more RSSI measurements performed using the first reception beam or the second indication of the one or more other RSSI measurements performed using the second reception beam may be transmitted by a UE to a base station alone or together with another report, e.g., as just one overall report, transmitted by the UE to a base station.

Figure 4:
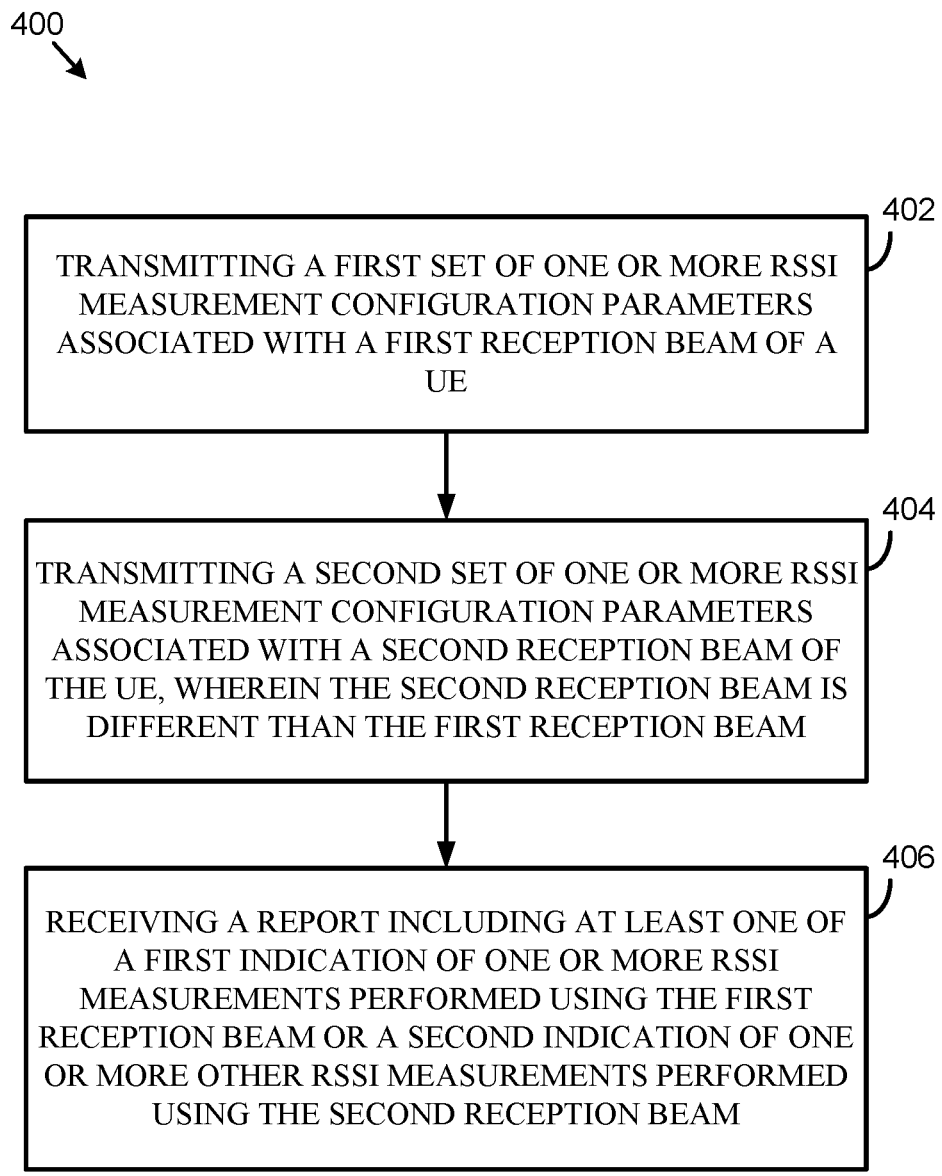
FIG. 4 is a block diagram illustrating another method for utilizing beam-specific RSSI and CO in NR-U wireless communication according to some aspects of the present disclosure.

FIG. 4, as another example, shows a block diagram illustrating another method for utilizing beam-specific RSSI and CO in NR-U wireless communication according to some aspects of the present disclosure. Aspects of method 400 may be implemented with various other aspects of this disclosure described with respect to FIGS. 1-2, 5-6, and 8, such as a base station/gNB. For example, with reference to FIG. 2, controller/processor 240 of base station 105 may control base station 105 to perform method 400.

FIG. 4 illustrates a method 400 that may be performed by a base station, such as a base station 105. At block 402, a base station, such as base station 105, may transmit a first set of one or more RSSI measurement configuration parameters associated with a first reception beam of a UE. At block 404, a base station may transmit a second set of one or more RSSI measurement configuration parameters associated with a second reception beam of the UE. In some aspects, the second reception beam may be different than the first reception beam. At block 406, a base station may receive a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

Figure 5:
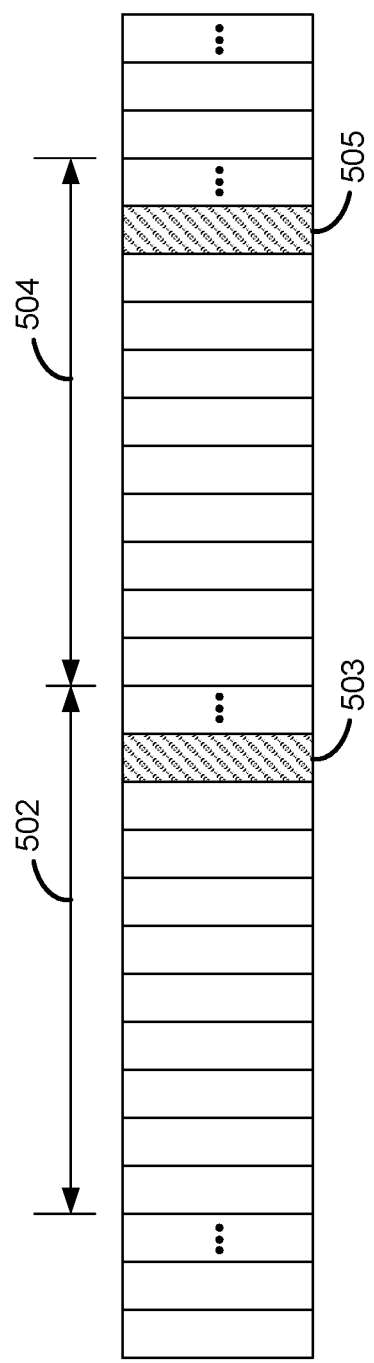
FIG. 5 is a block diagram illustrating an example of beam-specific RSSI and CO in NR-U wireless communication according to some aspects of the present disclosure.

FIG. 5 is a block diagram illustrating an example of beam-specific RSSI and CO in NR-U wireless communication according to some aspects of the present disclosure. FIG. 5 shows RSSI measurements configured to be performed using a single reception beam of a UE. In FIG. 5, two RSSI measurement periods, 502 and 504, are shown. In some aspects, RSSI measurements may be performed periodically using the same period, so RSSI measurement period 502 and RSSI measurement period 504 may both be associated with the same time duration. In FIG. 5, one or more RSSI measurements may be performed during region 503 of RSSI measurement period 502. The time and frequency features of region 503 may be specified by the one or more RSSI measurement configuration parameters received by a UE (e.g., as discussed with reference to block 302). Because of the periodic nature of the RSSI measurements, one or more additional RSSI measurements may be performed during region 505 of RSSI measurement period 504. Region 505 may be separated from region 503 by the time duration of the RSSI measurement periods, such as the time duration of RSSI measurement periods 502 and 504. The time and frequency features of region 505 may be specified by the one or more RSSI measurement configuration parameters received by a UE (e.g., as discussed with reference to block 302). In some aspects, the RSSI measurements performed in regions 503 and 505 may be performed using the same reception beam of a UE.

Figure 6:
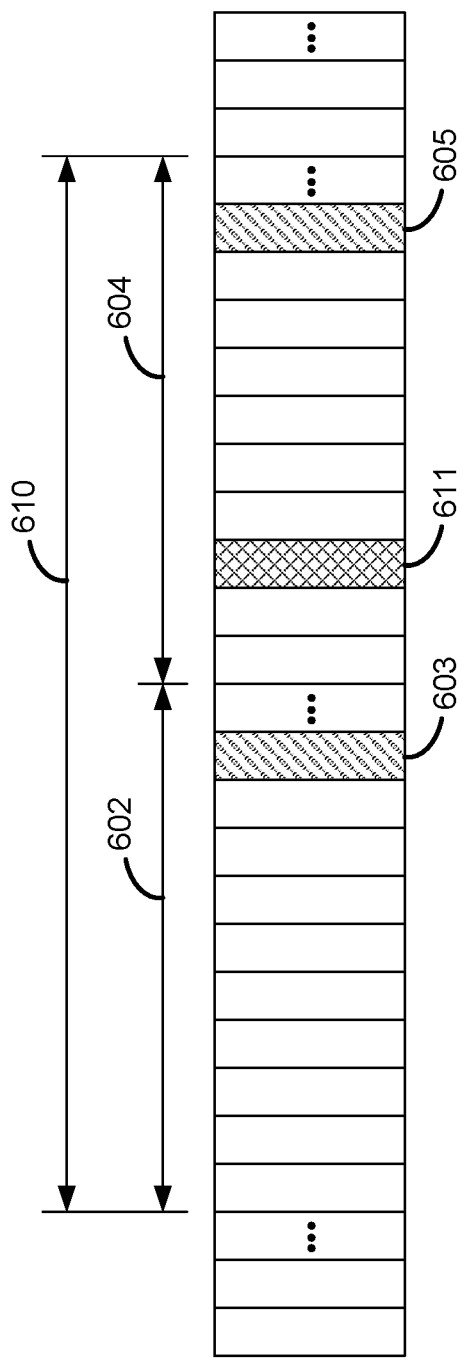
FIG. 6 is another block diagram illustrating another example of beam-specific RSSI and CO in NR-U wireless communication according to some aspects of the present disclosure.

FIG. 6 is another block diagram illustrating another example of beam-specific RSSI and CO in NR-U wireless communication according to some aspects of the present disclosure. FIG. 6 shows RSSI measurements configured to be performed using at least two reception beams of a UE. For example, in FIG. 6, two RSSI measurement periods, 602 and 604, associated with a first reception beam are shown. In some aspects, RSSI measurements may be performed periodically using the same period, so RSSI measurement period 602 and RSSI measurement period 604 may both be associated with the same time duration. In FIG. 6, a first set of one or more RSSI measurements may be performed during region 603 of RS SI measurement period 602 using the first reception beam. The time and frequency features of region 603 may be specified by a first set of one or more RSSI measurement configuration parameters associated with the first reception beam and received by a UE (e.g., as discussed with reference to block 302). Because of the periodic nature of the RSSI measurements, additional first set of one or more RSSI measurements may be performed during region 605 of RSSI measurement period 604 using the first reception beam. Region 605 may be separated from region 603 by the time duration of the RSSI measurement periods, such as the time duration of RSSI measurement periods 602 and 604. The time and frequency features of region 605 may be specified by the one or more RSSI measurement configuration parameters received by a UE (e.g., as discussed with reference to block 302). In some aspects, the RSSI measurements performed in regions 603 and 605 may be performed using the same reception beam of a UE.

FIG. 6 also shows an RSSI measurement period 610 associated with a second reception beam. In FIG. 6, a second set of one or more RSSI measurements may be performed during region 611 of RSSI measurement period 610 using the second reception beam. The time and frequency features of region 611 may be specified by a second set of one or more RSSI measurement configuration parameters associated with the second reception beam and received by a UE (e.g., as discussed with reference to block 304).

FIG. 6 illustrates that at least one parameter of the first set of one or more RSSI measurement configuration parameters may have a different value than a corresponding parameter of the second set of one or more RSSI measurement configuration parameters. FIG. 6 also illustrates that at least one parameter of the first set of one or more RSSI measurement configuration parameters may have the same value as a corresponding parameter of the second set of one or more RSSI measurement configuration parameters. For example, as shown in FIG. 6, the center frequency parameter indication may be the same for RSSI measurements performed using the first reception beam and the second reception beam. However, as also shown in FIG. 6, the measurement periodicity indication and the subframe offset indication for RSSI measurements performed using the first reception beam may both be different than the measurement periodicity indication and the subframe offset indication for RSSI measurements performed using the second reception beam. In particular, as shown in FIG. 6, the time duration of RSSI measurement periods 602 and 604 associated with the first reception beam is different than the time duration of RSSI measurement period 610 associated with the second reception beam.

Figure 7:
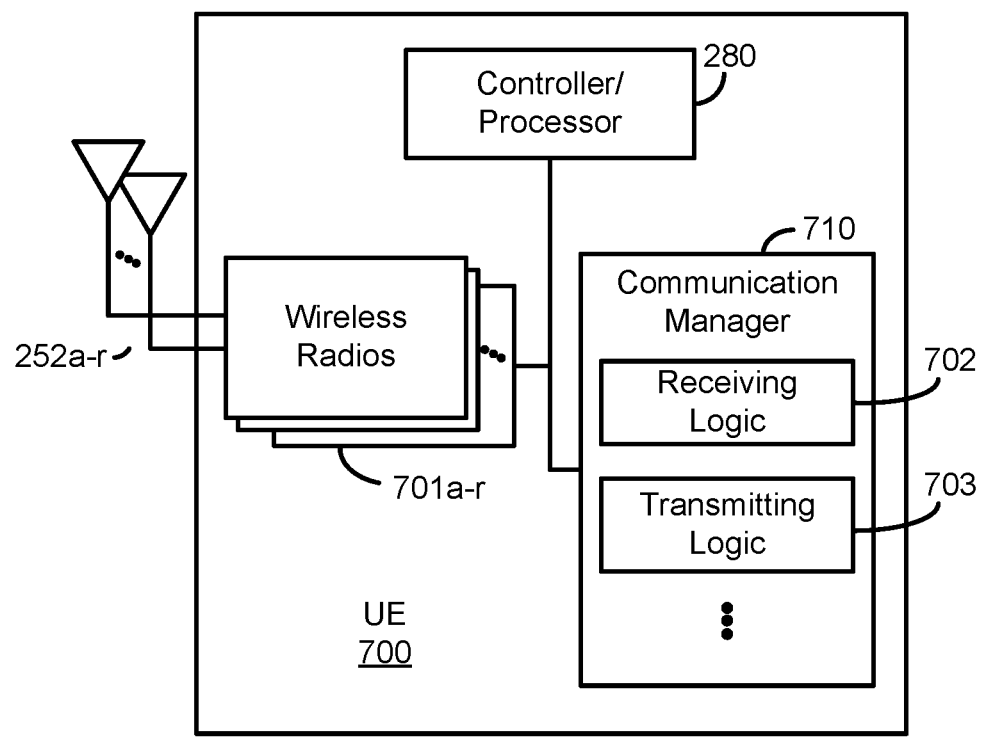
FIG. 7 is a block diagram conceptually illustrating a design of a UE configured according to some aspects of the present disclosure.

FIG. 7 shows a block diagram conceptually illustrating a design of a UE configured according to some aspects of the present disclosure. UE 700 may be configured to perform operations, including the blocks of the method 300 described with reference to FIG. 3. In some implementations, the UE 700 includes the structure, hardware, and components shown and described with reference to the UE 115 of FIGS. 1 and/or 2. For example, the UE 700 includes the controller 280, which operates to execute logic or computer instructions illustrated in communication manager 710, as well as controlling the components of the UE 700 that provide the features and functionality of the UE 700. The UE 700, under control of the controller 280, transmits and receives signals via wireless radios 701*a-r* and the antennas 252*a-r*. The wireless radios 701*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

Communication Manager 710 may include Receiving Logic 702 and Transmitting Logic 703. Portions of one or more of the components 702 and 703 may be implemented at least in part in hardware or software. In some implementations, at least one of the components 702 and 703 is implemented at least in part as software stored in a memory (such as memory 282). For example, portions of one or more of the components 702 and 703 can be implemented as non-transitory instructions or code executable by a processor (such as the controller 280) to perform the functions or operations of the respective component.

One or more of the components 702 and 703 illustrated in Communication Manager 710 may configure processor/controller 280 to carry out one or more procedures relating to wireless communication by the UE 700, as previously described. For example, Receiving Logic 702 may configure controller/processor 280 to carry out operations that include receiving a first set of one or more RSSI measurement configuration parameters associated with a first reception beam, in any manner previously described, such as with reference to block 302 (see FIG. 3). Additionally, Receiving Logic 702 may configure controller/processor 280 to carry out operations that include receiving a second set of one or more RSSI measurement configuration parameters associated with a second reception beam, wherein the second reception beam is different than the first reception beam, in any manner previously described, such as with reference to block 304 (see FIG. 3). In addition, Transmitting Logic 703 may configure controller/processor 280 to carry out operations that include transmitting a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters, in any manner previously described, such as with reference to block 306 (see FIG. 3). The UE 700 may receive signals from or transmit signals to one or more network entities, such as the base station 105 of FIGS. 1-2 or a base station as illustrated in FIG. 8.

Figure 8:
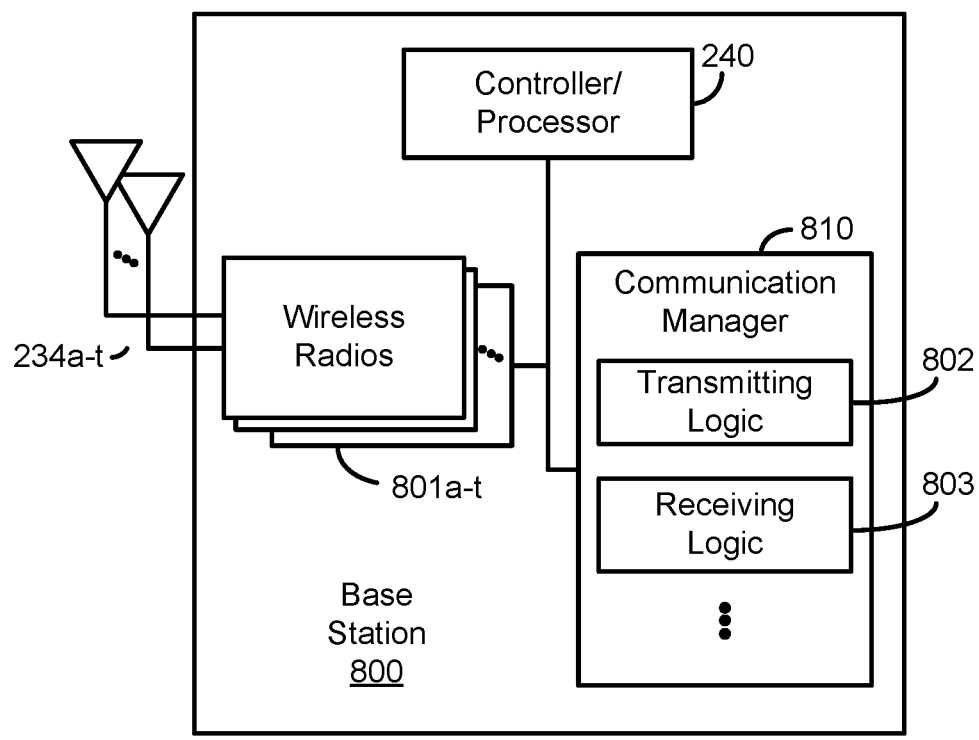
FIG. 8 is a block diagram conceptually illustrating a design of a base station (e.g., a gNB) configured according to some aspects of the present disclosure.

FIG. 8 shows a block diagram conceptually illustrating a design of a base station (e.g., a gNB) configured according to some aspects of the present disclosure. The base station 800 may be configured to perform operations, including the blocks of the method 400 described with reference to FIG. 4. In some implementations, the base station 800 includes the structure, hardware, and components shown and described with reference to the base station 105 of FIGS. 1-2. For example, the base station 800 may include the controller 240, which operates to execute logic or computer instructions illustrated in communication manager 810, as well as controlling the components of the base station 800 that provide the features and functionality of the base station 800. The base station 800, under control of the controller 240, transmits and receives signals via wireless radios 801*a-t* and the antennas 234*a-t*. The wireless radios 801*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

Communication Manager 810 may include Transmitting Logic 802 and Receiving Logic 803. Portions of one or more of component 802 and 803 may be implemented at least in part in hardware or software. In some implementations, at least one of components 802 and 803 is implemented at least in part as software stored in a memory (such as memory 242). For example, portions of one or more of components 802 and 803 can be implemented as non-transitory instructions or code executable by a processor (such as the controller 240) to perform the functions or operations of the respective component.

One or more of components 802 and 803 illustrated in Communication Manager 810 may configure processor/controller 280 to carry out one or more procedures relating to wireless communication by the base station 800, as previously described. For example, Transmitting Logic 802 may configure controller/processor 280 to carry out operations that include transmitting a first set of one or more RSSI measurement configuration parameters associated with a first reception beam of a UE, in any manner previously described, such as with reference to block 402 (see FIG. 4). Additionally, Transmitting Logic 802 may configure controller/processor 280 to carry out operations that include transmitting a second set of one or more RSSI measurement configuration parameters associated with a second reception beam of the UE, wherein the second reception beam is different than the first reception beam, in any manner previously described, such as with reference to block 404 (see FIG. 4). In addition, Receiving Logic 803 may configure controller/processor 280 to carry out operations that include receiving a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters, in any manner previously described, such as with reference to block 406 (see FIG. 4). The base station 800 may receive signals from or transmit signals to one or more UEs, such as the UE 115 of FIGS. 1-2 or the UE as illustrated in FIG. 7.

It is noted that one or more blocks (or operations) described with reference to FIGS. 3 and 4 may be combined with one or more blocks (or operations) described with reference to another of the figures. For example, one or more blocks (or operations) of FIG. 3 may be combined with one or more blocks (or operations) of FIG. 4. As another example, one or more blocks associated with FIG. 7 or 8 may be combined with one or more blocks (or operations) associated with FIG. 1 or 2.

In some aspects, techniques for utilizing beam-specific metrics in NR-U wireless communication to measure and report beam-specific interference information may include a base station transmitting, and a UE receiving, a first set of one or more RSSI measurement configuration parameters associated with a first reception beam of the UE as well as a second set of one or more RSSI measurement configuration parameters associated with a second reception beam of the UE. According to some aspects, the second reception beam may be different than the first reception beam. Techniques for utilizing beam-specific metrics in NR-U wireless communication to measure and report beam-specific interference information may also include a UE transmitting, and a base station receiving, a report including at least one of a first indication of one or more RSSI measurements performed using the first reception beam based, at least in part, on the first set of one or more RSSI measurement configuration parameters or a second indication of one or more other RSSI measurements performed using the second reception beam based, at least in part, on the second set of one or more RSSI measurement configuration parameters.

Techniques for utilizing beam-specific metrics in NR-U wireless communication to measure and report beam-specific interference information may include additional aspects, such as any single aspect or any combination of aspects described below and/or in connection with one or more other processes described elsewhere herein.

In a first aspect, at least one parameter of the first set of one or more RSSI measurement configuration parameters may have a different value than a corresponding parameter of the second set of one or more RSSI measurement configuration parameters.

In a second aspect, alone or in combination with the first aspect, RSSI measurement configuration parameters include at least one of an indication of a measurement duration; an indication of a measurement periodicity; an indication of a subframe offset; an indication of a center frequency parameter; an indication of a channel occupancy (CO) threshold; or an indication of a reporting periodicity.

In a third aspect, alone or in combination with one or more of the first and second aspects, the first set of one or more RSSI measurement configuration parameters may include a first measurement periodicity indication and the second set of one or more RSSI measurement configuration parameters may include a second measurement periodicity indication.

In some aspects, the first measurement periodicity indication value may be a multiple of the second measurement periodicity indication value.

In a fourth aspect, alone or in combination with one or more of the first through third aspects, the first set of one or more RSSI measurement configuration parameters may include a first reporting periodicity indication and the second set of one or more RSSI measurement configuration parameters may include a second reporting periodicity indication. In some aspects, the first reporting periodicity indication value may be a multiple of the second reporting periodicity indication value.

In a fifth aspect, alone or in combination with one or more of the first through fourth aspects, a UE may receive an indication of the first reception beam.

In a sixth aspect, alone or in combination with one or more of the first through fifth aspects, a UE may receive an indication of the second reception beam.

In a seventh aspect, alone or in combination with one or more of the first through sixth aspects, a base station may transmit an indication of the first reception beam.

In an eighth aspect, alone or in combination with one or more of the first through seventh aspects, a base station may transmit an indication of the second reception beam.

In a ninth aspect, alone or in combination with one or more of the first through eighth aspects, the first reception beam and the second reception beam may be a subset of a plurality of reception beams of the UE.

In a tenth aspect, alone or in combination with one or more of the first through ninth aspects, RSSI measurement configuration parameters may not be received by a UE, or transmitted by a base station, for remaining reception beams of the plurality of reception beams besides the first reception beam and the second reception beam.

In an eleventh aspect, alone or in combination with one or more of the first through tenth aspects, the first reception beam may be wider than the second reception beam.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
   receiving a first set of one or more beam specific received signal strength indicator (RSSI) measurement configuration parameters with respect to a first UE reception beam for one or more RSSI measurements to be performed using the first UE reception beam, wherein the first set of one or more beam specific RSSI measurement configuration parameters includes a first reporting periodicity indication, and wherein the first UE reception beam is to be formed by the UE to receive communication;
   receiving a second set of one or more beam specific RSSI measurement configuration parameters with respect to a second UE reception beam for one or more other RSSI measurements to be performed using the second UE reception beam, wherein the second set of one or more beam specific RSSI measurement configuration parameters includes a second reporting periodicity indication, wherein the second UE reception beam is to be formed by the UE to receive communication, and wherein the second UE reception beam is different than the first UE reception beam; and
   transmitting a report including at least one of:
      a first indication of one or more RSSI measurements performed using the first UE reception beam based, at least in part, on the first set of one or more beam specific RSSI measurement configuration parameters, wherein the report of the first indication of the one or more RSSI measurements performed using the first UE reception beam is transmitted in accordance with the first reporting periodicity indication; or
      a second indication of one or more other RSSI measurements performed using the second UE reception beam based, at least in part, on the second set of one or more beam specific RSSI measurement configuration parameters, wherein the report of the second indication of the one or more other RSSI measurements performed using the second UE reception beam is transmitted in accordance with the second reporting periodicity indication.

2. The method of claim 1, wherein at least one parameter of the first set of one or more beam specific RSSI measurement configuration parameters has a different value than a corresponding parameter of the second set of one or more beam specific RSSI measurement configuration parameters.

3. The method of claim 1, wherein the RSSI measurement configuration parameters include at least one of:
   an indication of a measurement duration;
   an indication of a measurement periodicity;
   an indication of a subframe offset;
   an indication of a center frequency parameter; or
   an indication of a channel occupancy (CO) threshold.

4. The method of claim 1, wherein the first set of one or more beam specific RSSI measurement configuration parameters includes a first measurement periodicity indication and the second set of one or more beam specific RSSI measurement configuration parameters includes a second measurement periodicity indication, and wherein a value of the first measurement periodicity indication is a multiple of a value of the second measurement periodicity indication.

5. The method of claim 1, wherein a value of the first reporting periodicity indication is a multiple of a value of the second reporting periodicity indication.

6. The method of claim 1, further comprising:
   receiving an indication of the first UE reception beam; and
   receiving an indication of the second UE reception beam.

7. The method of claim 1, wherein the first UE reception beam and the second UE reception beam are a subset of a plurality of UE reception beams, and wherein the RSSI measurement configuration parameters for one or more RSSI measurements performed using a UE reception beam of remaining UE reception beams of the plurality of UE reception beams are not received for the remaining UE reception beams of the plurality of UE reception beams besides the first UE reception beam and the second UE reception beam.

8. The method of claim 1, wherein the first UE reception beam is wider than the second UE reception beam.

9. The method of claim 1, performed using the second UE reception beam are performed in a millimeter wave frequency band.

10. The method of claim 1, performed using the second UE reception beam are performed in an unlicensed spectrum or shared spectrum.

11. A user equipment (UE), comprising:
    at least one processor; and
    a memory coupled to the at least one processor,
    wherein the at least one processor is configured to:
       receive a first set of one or more beam specific received signal strength indicator (RSSI) measurement configuration parameters with respect to a first UE reception beam for one or more RSSI measurements to be performed using the first UE reception beam, wherein the first set of one or more beam specific RSSI measurement configuration parameters includes a first reporting periodicity indication, and wherein the first UE reception beam is to be formed by the UE to receive communication;
       receive a second set of one or more beam specific RSSI measurement configuration parameters with respect to a second UE reception beam for one or more other RSSI measurements to be performed using the second UE reception beam, wherein the second set of one or more beam specific RSSI measurement configuration parameters includes a second reporting periodicity indication, wherein the second UE reception beam is to be formed by the UE to receive communication, and wherein the second UE reception beam is different than the first UE reception beam; and transmit a report including at least one of:
  a first indication of one or more RSSI measurements performed using the first UE reception beam based, at least in part, on the first set of one or more beam specific RSSI measurement configuration parameters, wherein the report of the first indication of the one or more RSSI measurements performed using the first UE reception beam is transmitted in accordance with the first reporting periodicity indication; or
  a second indication of one or more other RSSI measurements performed using the second UE reception beam based, at least in part, on the second set of one or more beam specific RSSI measurement configuration parameters, wherein the report of the second indication of the one or more other RSSI measurements performed using the second UE reception beam is transmitted in accordance with the second reporting periodicity indication.

12. The UE of claim 11, wherein at least one parameter of the first set of one or more beam specific RSSI measurement configuration parameters has a different value than a corresponding parameter of the second set of one or more beam specific RSSI measurement configuration parameters.

13. The UE of claim 11, wherein the RSSI measurement configuration parameters include at least one of:
  an indication of a measurement duration;
  an indication of a measurement periodicity;
  an indication of a subframe offset;
  an indication of a center frequency parameter; or
  an indication of a channel occupancy (CO) threshold.

14. The UE of claim 11, wherein the first set of one or more beam specific RSSI measurement configuration parameters includes a first measurement periodicity indication and the second set of one or more beam specific RSSI measurement configuration parameters includes a second measurement periodicity indication, and wherein a value of the first measurement periodicity indication is a multiple of a value of the second measurement periodicity indication.

15. The UE of claim 11, wherein a value of the first reporting periodicity indication is a multiple of a value of the second reporting periodicity indication.

16. The UE of claim 11, wherein the at least one processor is further configured to:
  receive an indication of the first UE reception beam; and
  receive an indication of the second UE reception beam.

17. The UE of claim 11, wherein the first UE reception beam and the second UE reception beam are a subset of a plurality of UE reception beams, and wherein the RSSI measurement configuration parameters for one or more RSSI measurements performed using a UE reception beam of remaining UE reception beams of the plurality of UE reception beams are not received for the remaining UE reception beams of the plurality of UE reception beams besides the first UE reception beam and the second UE reception beam.

18. The UE of claim 11, wherein the one or more RSSI measurements performed using the first UE reception beam and the one or more RSSI measurements performed using the second UE reception beam are performed in a millimeter wave frequency band.

19. The UE of claim 11, wherein the one or more RSSI measurements performed using the first UE reception beam and the one or more RSSI measurements performed using the second UE reception beam are performed in an unlicensed spectrum or shared spectrum.

20. A method for wireless communication performed by a network entity, the method comprising:
  transmitting a first set of one or more beam specific received signal strength indicator (RSSI) measurement configuration parameters with respect to a first user equipment (UE) reception beam of a UE for one or more RSSI measurements to be performed by the UE using the first UE reception beam, wherein the first set of one or more beam specific RSSI measurement configuration parameters includes a first reporting periodicity indication, and wherein the first UE reception beam comprises a first beam to be formed by the UE to receive communication;
  transmitting a second set of one or more beam specific RSSI measurement configuration parameters with respect to a second UE reception beam of the UE for one or more other RSSI measurements to be performed by the UE using the second UE reception beam, wherein the second set of one or more beam specific RSSI measurement configuration parameters includes a second reporting periodicity indication, wherein the second UE reception beam comprises a second beam to be formed by the UE to receive communication, and wherein the second UE reception beam is different than the first UE reception beam; and
  receiving a report including at least one of:
    a first indication of one or more RSSI measurements performed using the first UE reception beam based, at least in part, on the first set of one or more beam specific RSSI measurement configuration parameters, wherein the report of the first indication of the one or more RSSI measurements performed using the first UE reception beam is transmitted in accordance with the first reporting periodicity indication; or
    a second indication of one or more other RSSI measurements performed using the second UE reception beam based, at least in part, on the second set of one or more beam specific RSSI measurement configuration parameters, wherein the report of the second indication of the one or more other RSSI measurements performed using the second UE reception beam is transmitted in accordance with the second reporting periodicity indication.

21. The method of claim 20, wherein at least one parameter of the first set of one or more beam specific RSSI measurement configuration parameters has a different value than a corresponding parameter of the second set of one or more beam specific RSSI measurement configuration parameters.

22. The method of claim 20, wherein the RSSI measurement configuration parameters include at least one of:
  an indication of a measurement duration;
  an indication of a measurement periodicity;
  an indication of a subframe offset;
  an indication of a center frequency parameter; or
  an indication of a channel occupancy (CO) threshold.

23. The method of claim 20, wherein the first set of one or more beam specific RSSI measurement configuration parameters includes a first measurement periodicity indication and the second set of one or more beam specific RSSI measurement configuration parameters includes a second measurement periodicity indication, and wherein a value of the first measurement periodicity indication is a multiple of a value of the second measurement periodicity indication.

24. The method of claim 20, wherein a value of the first reporting periodicity indication is a multiple of a value of the second reporting periodicity indication.

25. The method of claim 20, further comprising:
transmitting an indication of the first UE reception beam; and
transmitting an indication of the second UE reception beam.

26. The method of claim 20, wherein the first UE reception beam and the second UE reception beam are a subset of a plurality of UE reception beams of the UE, and wherein the RSSI measurement configuration parameters for one or more RSSI measurements performed using a UE reception beam of remaining UE reception beams of the plurality of UE reception beams are not transmitted for the remaining UE reception beams of the plurality of UE reception beams besides the first UE reception beam and the second UE reception beam.

27. The method of claim 20, wherein the first UE reception beam is wider than the second UE reception beam.

28. The method of claim 20, wherein the one or more RSSI measurements performed using the first UE reception beam and the one or more RSSI measurements performed using the second UE reception beam were performed in a millimeter wave frequency band.

29. The method of claim 20, wherein the one or more RSSI measurements performed using the first UE reception beam and the one or more RSSI measurements performed using the second UE reception beam were performed in an unlicensed spectrum or shared spectrum.

30. A network entity, comprising:
at least one processor; and
a memory coupled to the at least one processor,
wherein the at least one processor is configured to:
transmit a first set of one or more beam specific received signal strength indicator (RSSI) measurement configuration parameters with respect to a first user equipment (UE) reception beam of a UE for one or more RSSI measurements to be performed by the UE using the first UE reception beam, wherein the first set of one or more beam specific RSSI measurement configuration parameters includes a first reporting periodicity indication, and wherein the first UE reception beam comprises a first beam to be formed by the UE to receive communication;
transmit a second set of one or more beam specific RSSI measurement configuration parameters with respect to a second UE reception beam of the UE for one or more other RSSI measurements to be performed by the UE using the second UE reception beam, wherein the second set of one or more beam specific RSSI measurement configuration parameters includes a second reporting periodicity indication, wherein the second UE reception beam comprises a second beam to be formed by the UE to receive communication, and wherein the second UE reception beam is different than the first UE reception beam; and
receive a report including at least one of:
a first indication of one or more RSSI measurements performed using the first UE reception beam based, at least in part, on the first set of one or more beam specific RSSI measurement configuration parameters, wherein the report of the first indication of the one or more RSSI measurements performed using the first UE reception beam is transmitted in accordance with the first reporting periodicity indication; or
a second indication of one or more other RSSI measurements performed using the second UE reception beam based, at least in part, on the second set of one or more beam specific RSSI measurement configuration parameters, wherein the report of the second indication of the one or more other RSSI measurements performed using the second UE reception beam is transmitted in accordance with the second reporting periodicity indication.

31. The network entity of claim 30, wherein at least one parameter of the first set of one or more beam specific RSSI measurement configuration parameters has a different value than a corresponding parameter of the second set of one or more beam specific RSSI measurement configuration parameters.

32. The network entity of claim 30, wherein the RSSI measurement configuration parameters include at least one of:
an indication of a measurement duration;
an indication of a measurement periodicity;
an indication of a subframe offset;
an indication of a center frequency parameter; or
an indication of a channel occupancy (CO) threshold.

33. The network entity of claim 30, wherein the first set of one or more beam specific RSSI measurement configuration parameters includes a first measurement periodicity indication and the second set of one or more beam specific RSSI measurement configuration parameters includes a second measurement periodicity indication, and wherein a value of the first measurement periodicity indication is a multiple of a value of the second measurement periodicity indication.

34. The network entity of claim 30, wherein a value of the first reporting periodicity indication is a multiple of a value of the second reporting periodicity indication.

35. The network entity of claim 30, wherein the at least one processor is further configured to:
transmit an indication of the first UE reception beam; and
transmit an indication of the second UE reception beam.

36. The network entity of claim 30, wherein the first UE reception beam and the second UE reception beam are a subset of a plurality of UE reception beams of the UE, and wherein the RSSI measurement configuration parameters for one or more RSSI measurements performed using a UE reception beam of remaining UE reception beams of the plurality of UE reception beams are not transmitted for the remaining UE reception beams of the plurality of UE reception beams besides the first UE reception beam and the second UE reception beam.

37. The network entity of claim 30, wherein the one or more RSSI measurements performed using the first UE reception beam and the one or more RSSI measurements performed using the second UE reception beam were performed in a millimeter wave frequency band.

38. The network entity of claim 30, wherein the one or more RSSI measurements performed using the first UE reception beam and the one or more RSSI measurements performed using the second UE reception beam were performed in an unlicensed spectrum or shared spectrum.

\* \* \* \* \*